US010295217B2

(12) United States Patent
Goel

(10) Patent No.: US 10,295,217 B2
(45) Date of Patent: May 21, 2019

(54) METHOD AND APPARATUS FOR OPTIMIZING LATENT CAPACITY OF A VARIABLE SPEED COMPRESSOR SYSTEM

(71) Applicant: Lennox Industries Inc., Richardson, TX (US)

(72) Inventor: Rakesh Goel, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 154 days.

(21) Appl. No.: 15/177,639

(22) Filed: Jun. 9, 2016

(65) Prior Publication Data

US 2017/0356671 A1 Dec. 14, 2017

(51) Int. Cl.
*F24F 11/77* (2018.01)
*F24F 11/83* (2018.01)
(Continued)

(52) U.S. Cl.
CPC .............. *F24F 11/77* (2018.01); *F24F 11/72* (2018.01); *F24F 11/76* (2018.01); *F24F 11/83* (2018.01);
(Continued)

(58) Field of Classification Search
CPC ........ F24F 11/77; F24F 11/83; F25B 2600/11; F25B 49/02
See application file for complete search history.

(56) References Cited

U.S. PATENT DOCUMENTS 4,408,713 A * 10/1983 Iijima ................ B60H 1/00828 165/202
4,744,223 A * 5/1988 Umezu ............. G05D 23/1917 62/176.5

(Continued)

FOREIGN PATENT DOCUMENTS

AU 2011100169 A4 3/2011
CA 2775540 A1 11/2012

(Continued)

OTHER PUBLICATIONS

U.S. Appl. No. 14/954,531, Goel et al.

(Continued)

*Primary Examiner* — Henry T Crenshaw
(74) *Attorney, Agent, or Firm* — Winstead PC

(57) ABSTRACT

An HVAC system includes an evaporator coil and a metering device fluidly coupled to the evaporator coil. The HVAC system also includes a variable-speed circulation fan and a condenser coil fluidly coupled to the metering device. The HVAC system also includes a variable-speed compressor fluidly coupled to the condenser coil and the evaporator coil and a controller operatively coupled to the variable-speed compressor and the variable-speed circulation fan. The controller is configured to measure a speed of the variable-speed compressor, calculate a normal cooling Cubic Feet per Minute (CFM), measure a speed of the variable-speed circulation fan, and determine if the speed of the variable-speed circulation fan exceeds the normal cooling CFM. If the speed of the variable-speed circulation fan exceeds the (Continued)

normal cooling CFM, the HVAC controller adjusts a speed of at least one of the variable-speed compressor and the variable-speed circulation fan.

15 Claims, 3 Drawing Sheets

(51) Int. Cl.

| | |
|---|---|
| ***F24F 11/85*** | (2018.01) |
| ***F24F 11/72*** | (2018.01) |
| ***F24F 11/76*** | (2018.01) |
| ***F25B 49/02*** | (2006.01) |
| ***F25D 17/06*** | (2006.01) |

(52) U.S. Cl.
CPC .............. *F25B 49/02* (2013.01); *F25D 17/06* (2013.01); *F24F 11/85* (2018.01); *F25B 2600/11* (2013.01)

(56) References Cited

U.S. PATENT DOCUMENTS 4,813,474 A 3/1989 Umezu
4,873,649 A * 10/1989 Grald ...................... F25B 49/02 700/276
5,058,388 A 10/1991 Shaw et al.
5,062,276 A * 11/1991 Dudley .................... F24F 11/00 62/176.6
5,095,715 A * 3/1992 Dudley ................... F24D 17/02 237/2 B
5,481,166 A * 1/1996 Moreira .................... H02P 6/18 318/400.04
5,832,744 A 11/1998 Dorste et al.
6,055,819 A * 5/2000 Kang .................... F25B 47/006 62/184
6,070,110 A * 5/2000 Shah .................... F24F 11/0008 165/205
6,427,454 B1 8/2002 West
6,789,881 B2 9/2004 Silverbrook
6,792,767 B1 9/2004 Pargeter et al.
6,826,921 B1 12/2004 Uselton
6,826,922 B2 12/2004 Patel et al.
7,770,405 B1 8/2010 Dillon
8,397,522 B2 3/2013 Springer et al.
8,689,582 B2 4/2014 Birkelund et al.
8,948,918 B2 2/2015 Chamorro et al.
2005/0056042 A1 3/2005 Bourne et al.
2005/0241325 A1 11/2005 Olney
2005/0278071 A1* 12/2005 Durham ............. G05D 23/1932 700/276
2008/0098756 A1 5/2008 Uselton
2008/0245083 A1 10/2008 Tutunoglu et al.
2008/0307803 A1* 12/2008 Herzon ................... F24F 3/147 62/93
2009/0192650 A1 7/2009 Tonner
2009/0205354 A1 8/2009 Brown
2009/0277193 A1* 11/2009 Springer ................. F24F 3/153 62/93
2010/0082161 A1 4/2010 Patch
2010/0082162 A1 4/2010 Mundy et al.
2010/0307733 A1 12/2010 Karamanos et al.
2011/0083454 A1 4/2011 Kopko et al.
2011/0208325 A1* 8/2011 Liu ........................... F25B 1/10 700/28
2012/0137713 A1 6/2012 Duraisamy et al.
2012/0303165 A1 11/2012 Qu et al.
2012/0318007 A1 12/2012 Lukasse et al.
2013/0061619 A1* 3/2013 Saitou ...................... F24F 11/77 62/89
2013/0213064 A1 8/2013 Gomes et al.
2013/0255297 A1 10/2013 Matsuoka et al.
2014/0131009 A1 5/2014 Zhou et al.
2014/0245762 A1 9/2014 Schlesinger
2014/0345307 A1 11/2014 Bagley et al.
2014/0360211 A1 12/2014 Hovel et al.
2015/0021005 A1 1/2015 Land, III
2015/0075766 A1 3/2015 Alston
2015/0233623 A1 8/2015 Izadi-Zamanabadi et al.
2015/0323423 A1 11/2015 Alsaleem
2015/0337831 A1* 11/2015 Zhou ....................... F04B 49/20 700/276
2016/0273815 A1 9/2016 Downie et al.

FOREIGN PATENT DOCUMENTS

WO WO-8912269 A1 12/1989
WO WO-97/32167 A1 9/1997

OTHER PUBLICATIONS

U.S. Appl. No. 14/954,558, Goel et al.
U.S. Appl. No. 15/044,243, Goel et al.
U.S. Appl. No. 15/177,585, Goel.
Research and Development Roadmap for Emerging HVAC Technologies—Goetzier et al. (Oct. 2014).

* cited by examiner

METHOD AND APPARATUS FOR OPTIMIZING LATENT CAPACITY OF A VARIABLE SPEED COMPRESSOR SYSTEM

CROSS-REFERENCE TO RELATED APPLICATIONS

U.S. patent application Ser. No. 14/954,531, filed Nov. 30, 2015, U.S. patent application Ser. No. 14/954,558, filed Nov. 30, 2015, and U.S. patent application Ser. No. 15/044,243, filed Feb. 16, 2016 are each incorporated herein by reference. This patent application incorporates by reference for any purpose the entire disclosure of the U.S. patent application Ser. No. 15/177,585 titled METHOD AND SYSTEM FOR OPTIMIZING A SPEED OF AT LEAST ONE OF A VARIABLE SPEED COMPRESSOR AND A VARIABLE SPEED CIRCULATION FAN TO IMPROVE LATENT CAPACITY.

TECHNICAL FIELD

The present invention relates generally to heating, ventilation, and air conditioning (HVAC) systems and more particularly, but not by way of limitation, to utilizing a variable-speed compressor to maximize latent capacity of an HVAC system.

BACKGROUND

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air). To direct operation of the circulation fan and other components, HVAC systems include a controller. In addition to directing operation of the HVAC system, the controller may be used to monitor various components, (i.e. equipment) of the HVAC system to determine if the components are functioning properly.

SUMMARY

In one aspect, the present invention relates to a heating, ventilation, and air conditioning (HVAC) system. The HVAC system includes an evaporator coil and a metering device fluidly coupled to the evaporator coil. The HVAC system also includes a variable-speed circulation fan for circulating air around the evaporator coil and a condenser coil fluidly coupled to the metering device. The HVAC system also includes a variable-speed compressor fluidly coupled to the condenser coil and the evaporator coil and a controller operatively coupled to the variable-speed compressor and the variable-speed circulation fan. The controller is configured to measure a speed of the variable-speed compressor, calculate a normal cooling Cubic Feet per Minute (CFM), measure a speed of the variable-speed circulation fan, and determine if the speed of the variable-speed circulation fan exceeds the normal cooling CFM. Responsive to a determination that the speed of the variable-speed circulation fan exceeds the normal cooling CFM, the HVAC controller adjusts a speed of at least one of the variable-speed compressor and the variable-speed circulation fan to increase latent capacity of the HVAC system.

In another aspect, the present invention relates to a method of optimizing latent capacity of an HVAC system. The method includes measuring, using a controller, a speed of a variable-speed compressor and calculating, using the controller, a normal cooling CFM from the measured speed of the variable-speed compressor. The method also includes measuring, using the controller, a speed of a variable-speed circulation fan and determining if the speed of the variable-speed circulation fan exceeds the normal cooling CFM. Responsive to a determination that a speed of the variable-speed circulation fan exceeds the normal cooling CFM, adjusting, via the controller, at least one of the speed of the variable-speed compressor and the speed of the variable-speed circulation fan to increase latent capacity of the HVAC system.

In one aspect, the present invention relates to a heating, ventilation, and air conditioning (HVAC) system. The HVAC system includes an evaporator coil and a metering device fluidly coupled to the evaporator coil. The HVAC system also includes a variable-speed circulation fan for circulating air around the evaporator coil and a condenser coil fluidly coupled to the metering device. The HVAC system also includes a variable-speed compressor fluidly coupled to the condenser coil and the evaporator coil and a controller operatively coupled to the variable-speed compressor and the variable-speed circulation fan. The controller is configured to measure a speed of the variable-speed compressor, calculate a normal cooling Cubic Feet per Minute (CFM), measure a speed of the variable-speed circulation fan, and determine if the speed of the variable-speed circulation fan exceeds the normal cooling CFM. Responsive to a determination that the speed of the variable-speed circulation fan exceeds the normal cooling CFM, the HVAC controller determines if a speed of the variable-speed circulation fan can be lowered. Responsive to a determination that a speed of the variable-speed circulation fan can be lowered, the HVAC controller adjusts a speed the variable-speed circulation fan.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
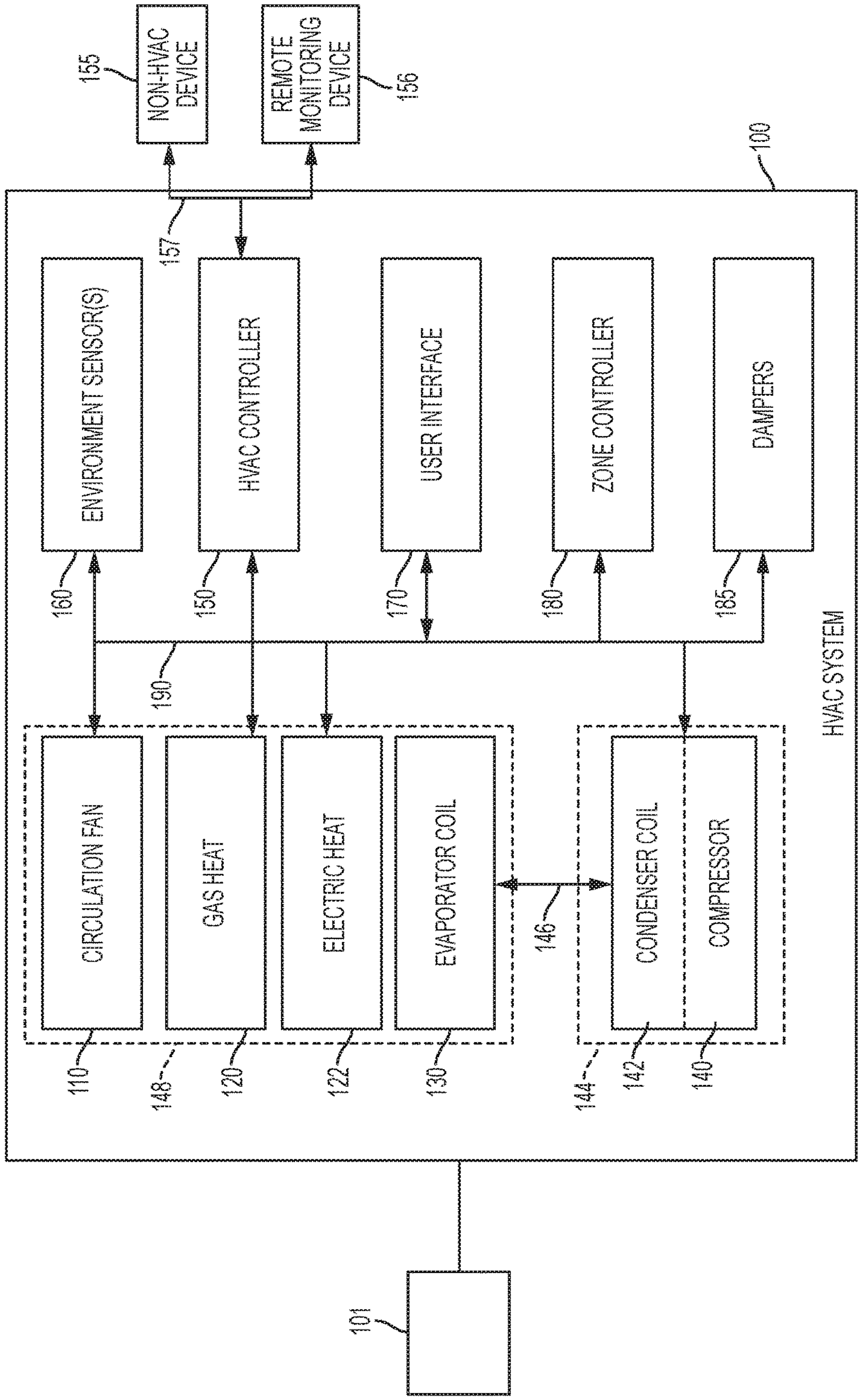
FIG. 1 is a block diagram of an exemplary HVAC system.

Various embodiments of the present invention will now be described more fully with reference to the accompanying drawings. The invention may, however, be embodied in many different forms and should not be construed as limited to the embodiments set forth herein.

HVAC systems are frequently utilized to adjust both temperature of conditioned air as well as relative humidity of the conditioned air. A cooling capacity of an HVAC system is a combination of the HVAC system's sensible cooling capacity and latent cooling capacity. Sensible cooling capacity refers to an ability of the HVAC system to remove sensible heat from conditioned air. Latent cooling capacity refers to an ability of the HVAC system to remove latent heat from conditioned air. In a typical embodiment, sensible cooling capacity and latent cooling capacity vary with environmental conditions. Sensible heat refers to heat that, when added to or removed from the conditioned air, results in a temperature change of the conditioned air. Latent heat refers to heat that, when added to or removed from the conditioned air, results in a phase change of, for example, water within the conditioned air. Sensible-to-total ratio ("S/T ratio") is a ratio of sensible heat to total heat (sensible heat+latent heat). The lower the S/T ratio, the higher the latent cooling capacity of the HVAC system for given environmental conditions. Normal cooling Cubic Feet per Minute ("CFM") refers to an industry standard indoor blower speed for a particular set of operating conditions. Normal cooling CFM is defined by Equation 1.

$$\dot{V}_{Normal} = \frac{F_a}{F_R}(\text{tonnage})(K) \qquad \text{Equation 1}$$

Where $\dot{V}_{Normal}$ is the Normal cooling CFM, $F_a$ is an actual speed of a variable-speed compressor (Hz), $F_R$ is the rated speed of the variable-speed compressor (Hz), tonnage is the rated tonnage of the HVAC system, and K is a multiplier. In a typical embodiment, the multiplier ranges from approximately 350 to approximately 450 depending on design considerations and application. An exemplary multiplier of 400 is used herein for purposes of discussion. In a typical embodiment, the rated speed ($F_R$) is a known constant associated with a particular variable-speed compressor and the rated tonnage is a known constant associated with a particular HVAC system.

Sensible cooling load refers to an amount of heat that must be removed from the enclosed space to accomplish a desired temperature change of the air within the enclosed space. The sensible cooling load is reflected by a temperature within the enclosed space as read, for example, on a dry-bulb thermometer. Latent cooling load refers to an amount of heat that must be removed from the enclosed space to accomplish a desired change in humidity of the air within the enclosed space. The latent cooling load is reflected by a temperature within the enclosed space as read, for example, on a wet-bulb thermometer. Setpoint or temperature setpoint refers to a target temperature setting of the HVAC system as set by a user or automatically based on a pre-defined schedule.

When there is a high sensible cooling load such as, for example, when outside-air temperature is significantly warmer than an inside-air temperature setpoint, the HVAC system will continue to operate in an effort to effectively cool and dehumidify the conditioned air. When there is a low sensible cooling load but high relative humidity such as, for example, when the outside air temperature is relatively close to the inside air temperature setpoint, but the outside air is considerably more humid than the inside air, additional steps must be undertaken to increase the moisture-removal capability of the HVAC system to avoid occupant discomfort. As will be described in more detail below, re-heat dehumidification is one method to remove additional moisture from the conditioned air. Additionally, it has been found that limiting indoor blower speed to a speed below Normal cooling CFM ensures that the S/T ratio does not rise above, for example, 0.8. Maintaining the S/T ratio below, for example, 0.8 maintains latent capacity of the HVAC system. Maintaining the indoor blower speed below the Normal cooling CFM will optimize the latent capacity of the HVAC system without the use of systems such as re-heat dehumidification.

FIG. 1 illustrates an HVAC system 100. In a typical embodiment, the HVAC system 100 is a networked HVAC system that is configured to condition air via, for example, heating, cooling, humidifying, or dehumidifying air within an enclosed space 101. In a typical embodiment, the enclosed space 101 is, for example, a house, an office building, a warehouse, and the like. Thus, the HVAC system 100 can be a residential system or a commercial system such as, for example, a roof top system. For exemplary illustration, the HVAC system 100 as illustrated in FIG. 1 includes various components; however, in other embodiments, the HVAC system 100 may include additional components that are not illustrated but typically included within HVAC systems.

The HVAC system 100 includes a variable-speed circulation fan 110, a gas heat 120, electric heat 122 typically associated with the variable-speed circulation fan 110, and a refrigerant evaporator coil 130, also typically associated with the variable-speed circulation fan 110. The variable-speed circulation fan 110, the gas heat 120, the electric heat 122, and the refrigerant evaporator coil 130 are collectively referred to as an "indoor unit" 148. In a typical embodiment, the indoor unit 148 is located within, or in close proximity to, the enclosed space 101. The HVAC system 100 also includes a variable-speed compressor 140 and an associated condenser coil 142, which are typically referred to as an "outdoor unit" 144. In various embodiments, the outdoor unit 144 is, for example, a rooftop unit or a ground-level unit. The variable-speed compressor 140 and the associated condenser coil 142 are connected to an associated evaporator coil 130 by a refrigerant line 146. In a typical embodiment, the variable-speed compressor 140 is, for example, a single-stage compressor, a multi-stage compressor, a single-speed compressor, or a variable-speed compressor. The variable-speed circulation fan 110, sometimes referred to as a blower, is configured to operate at different capacities (i.e., variable motor speeds) to circulate air through the HVAC system 100, whereby the circulated air is conditioned and supplied to the enclosed space 101.

Still referring to FIG. 1, the HVAC system 100 includes an HVAC controller 150 that is configured to control operation of the various components of the HVAC system 100 such as, for example, the variable-speed circulation fan 110, the gas heat 120, the electric heat 122, and the variable-speed compressor 140 to regulate the environment of the enclosed space 101. In some embodiments, the HVAC system 100 can be a zoned system. In such embodiments, the HVAC system 100 includes a zone controller 180, dampers 185, and a plurality of environment sensors 160. In a typical embodiment, the HVAC controller 150 cooperates with the zone controller 180 and the dampers 185 to regulate the environment of the enclosed space 101.

The HVAC controller 150 may be an integrated controller or a distributed controller that directs operation of the HVAC system 100. In a typical embodiment, the HVAC controller 150 includes an interface to receive, for example, thermostat calls, temperature setpoints, blower control signals, environmental conditions, and operating mode status for various zones of the HVAC system 100. For example, in a typical embodiment, the environmental conditions may include indoor temperature and relative humidity of the enclosed space 101. In a typical embodiment, the HVAC controller 150 also includes a processor and a memory to direct operation of the HVAC system 100 including, for example, a speed of the variable-speed circulation fan 110.

Still referring to FIG. 1, in some embodiments, the plurality of environment sensors 160 are associated with the HVAC controller 150 and also optionally associated with a user interface 170. The plurality of environment sensors 160 provide environmental information within a zone or zones of the enclosed space 101 such as, for example, temperature and humidity of the enclosed space 101 to the HVAC controller 150. The plurality of environment sensors 160 may also send the environmental information to a display of the user interface 170. In some embodiments, the user interface 170 provides additional functions such as, for example, operational, diagnostic, status message display, and a visual interface that allows at least one of an installer, a user, a support entity, and a service provider to perform actions with respect to the HVAC system 100. In some embodiments, the user interface 170 is, for example, a thermostat of the HVAC system 100. In other embodiments, the user interface 170 is associated with at least one sensor of the plurality of environment sensors 160 to determine the environmental condition information and communicate that information to the user. The user interface 170 may also include a display, buttons, a microphone, a speaker, or other components to communicate with the user. Additionally, the user interface 170 may include a processor and memory that is configured to receive user-determined parameters such as, for example, a relative humidity of the enclosed space 101, and calculate operational parameters of the HVAC system 100 as disclosed herein.

In a typical embodiment, the HVAC system 100 is configured to communicate with a plurality of devices such as, for example, a communication device 155, a monitoring device 156, and the like. In a typical embodiment, the monitoring device 156 is not part of the HVAC system. For example, the monitoring device 156 is a server or computer of a third party such as, for example, a manufacturer, a support entity, a service provider, and the like. In other embodiments, the monitoring device 156 is located at an office of, for example, the manufacturer, the support entity, the service provider, and the like.

In a typical embodiment, the communication device 155 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In a typical embodiment, the communication device 155 includes at least one processor, memory and a user interface, such as a display. One skilled in the art will also understand that the communication device 155 disclosed herein includes other components that are typically included in such devices including, for example, a power supply, a communications interface, and the like.

The zone controller 180 is configured to manage movement of conditioned air to designated zones of the enclosed space 101. Each of the designated zones include at least one conditioning or demand unit such as, for example, the gas heat 120 and at least one user interface 170 such as, for example, the thermostat. The zone-controlled HVAC system 100 allows the user to independently control the temperature in the designated zones. In a typical embodiment, the zone controller 180 operates electronic dampers 185 to control air flow to the zones of the enclosed space 101.

In some embodiments, a data bus 190, which in the illustrated embodiment is a serial bus, couples various components of the HVAC system 100 together such that data is communicated therebetween. In a typical embodiment, the data bus 190 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 190 may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 190 may include any number, type, or configuration of data buses 190, where appropriate. In particular embodiments, one or more data buses 190 (which may each include an address bus and a data bus) may couple the HVAC controller 150 to other components of the HVAC system 100. In other embodiments, connections between various components of the HVAC system 100 are wired. For example, conventional cable and contacts may be used to couple the HVAC controller 150 to the various components. In some embodiments, a wireless connection is employed to provide at least some of the connections between components of the HVAC system such as, for example, a connection between the HVAC controller 150 and the variable-speed circulation fan 110, the variable-speed compressor 140, or the plurality of environment sensors 160.

Figure 2:
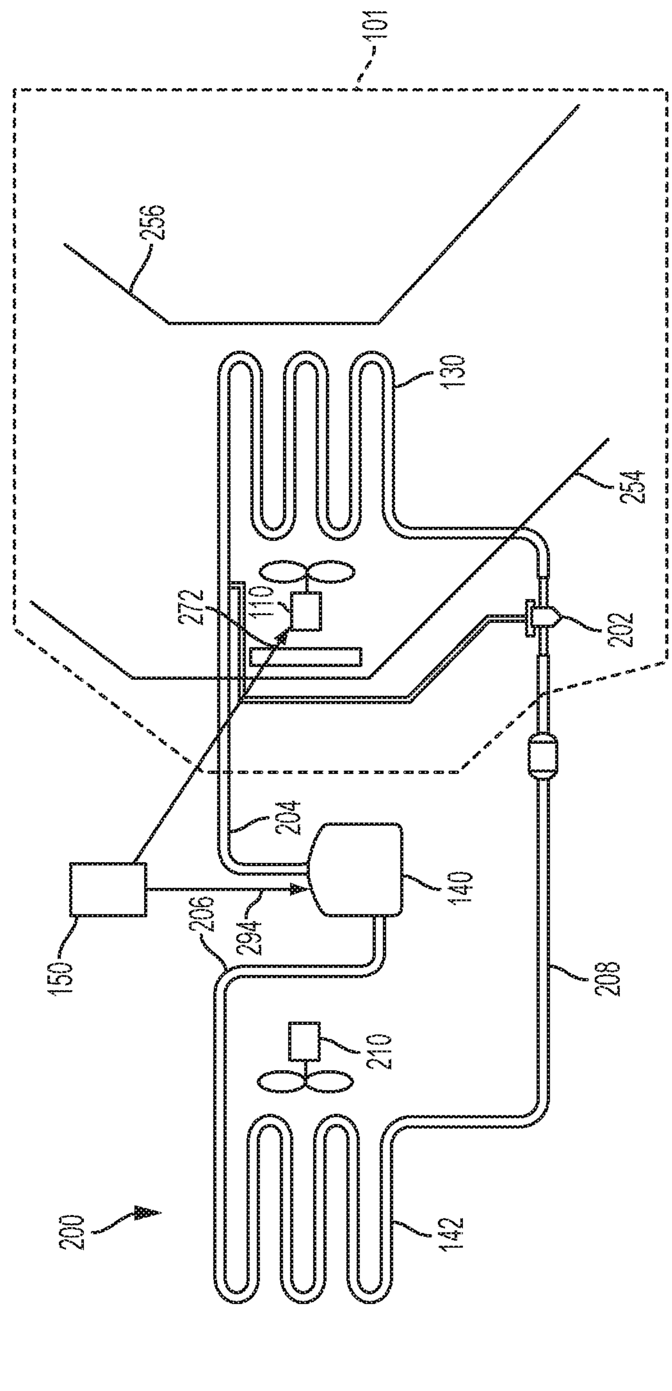
FIG. 2 is a schematic diagram of an exemplary HVAC system.

FIG. 2 is a schematic diagram of an exemplary HVAC system 200. For illustrative purposes, FIG. 2 will be described herein relative to FIG. 1. In a typical embodiment, the HVAC system 200 may be arranged as, for example, a package HVAC system, a split HVAC system, or any other HVAC system arrangement as dictated by design requirements. The HVAC system 200 includes the refrigerant evaporator coil 130, the condenser coil 142, the variable-speed compressor 140, and a metering device 202. In a typical embodiment, the metering device 202 is, for example, a thermostatic expansion valve or a throttling valve. The refrigerant evaporator coil 130 is fluidly coupled to the variable-speed compressor 140 via a suction line 204. The variable-speed compressor 140 is fluidly coupled to the condenser coil 142 via a discharge line 206. The condenser coil 142 is fluidly coupled to the metering device 202 via a liquid line 208.

Still referring to FIG. 2, during operation, low-pressure, low-temperature refrigerant is circulated through the refrigerant evaporator coil 130. The refrigerant is initially in a liquid/vapor state. In a typical embodiment, the refrigerant is, for example, R-22, R-134a, R-410A, R-744, or any other suitable type of refrigerant as dictated by design requirements. Air from within the enclosed space 101, which is typically warmer than the refrigerant, is circulated around the refrigerant evaporator coil 130 by the variable-speed circulation fan 110. In a typical embodiment, the refrigerant begins to boil after absorbing heat from the air and changes state to a low-pressure, low-temperature, super-heated vapor refrigerant. Saturated vapor, saturated liquid, and saturated fluid refer to a thermodynamic state where a liquid and its vapor exist in approximate equilibrium with each other. Super-heated fluid and super-heated vapor refer to a thermodynamic state where a vapor is heated above a saturation temperature of the vapor. Sub-cooled fluid and sub-cooled liquid refers to a thermodynamic state where a liquid is cooled below the saturation temperature of the liquid.

The low-pressure, low-temperature, super-heated vapor refrigerant is introduced into the variable-speed compressor 140 via the suction line 204. In a typical embodiment, the variable-speed compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. After leaving the variable-speed compressor 140, the high-pressure, high-temperature, superheated vapor refrigerant travels through a re-heat return line 268 and enters the condenser coil 142.

Outside air is circulated around the condenser coil 142 by a variable-speed condenser fan 210. The outside air is typically cooler than the high-pressure, high-temperature, superheated vapor refrigerant present in the condenser coil 142. Thus, heat is transferred from the high-pressure, high-temperature, superheated vapor refrigerant to the outside air. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 142 via the liquid line 208 and enters the metering device 202.

In the metering device 202, the pressure of the high-pressure, high-temperature, sub-cooled liquid refrigerant is abruptly reduced. In various embodiments where the metering device 202 is, for example, a thermostatic expansion valve, the metering device 202 reduces the pressure of the high-pressure, high-temperature, sub-cooled liquid refrigerant by regulating an amount of refrigerant that travels to the refrigerant evaporator coil 130. Abrupt reduction of the pressure of the high-pressure, high-temperature, sub-cooled liquid refrigerant causes rapid evaporation of a portion of the high-pressure, high-temperature, sub-cooled liquid refrigerant, commonly known as flash evaporation. The flash evaporation lowers the temperature of the resulting liquid/vapor refrigerant mixture to a temperature lower than a temperature of the air in the enclosed space 101. The liquid/vapor refrigerant mixture leaves the metering device 202 and returns to the refrigerant evaporator coil 130.

Still referring to FIG. 2, the HVAC controller 150 measures a speed of the variable-speed compressor 140 and the variable-speed circulation fan 110. In a typical embodiment, the HVAC controller 150 continuously measures a speed of the variable-speed compressor and the variable-speed circulation fan 110; however, in other embodiments, the HVAC controller measures a speed of the variable-speed compressor 140 and the variable-speed circulation fan 110 at periodic time intervals such as, for example, every five seconds. The HVAC controller 150 determines the Normal cooling CFM from the measured speed of the variable-speed compressor, the rated speed of the variable-speed compressor 140, and the tonnage of, for example, the HVAC system 200. In a typical embodiment, the Normal cooling CFM is calculated according to Equation 1. The HVAC controller 150 compares the Normal cooling CFM to the measured speed of the variable-speed circulation fan 110. In a typical embodiment, the HVAC controller 150 compares the measured speed of the variable-speed circulation fan 110 to the Normal cooling CFM continuously; however, in other embodiments, the HVAC controller 150 compares the measured speed of the variable-speed circulation fan 110 to the Normal cooling CFM according at periodic time intervals such as, for example, every five seconds.

Still referring to FIG. 2, in a typical embodiment, cooling demand of the HVAC system 200 will be tied to one of the speed of the variable-speed compressor 140 and the speed of the variable-speed circulation fan 110. In embodiments where cooling demand is tied to the speed of the variable-speed compressor 140, if the HVAC controller 150 determines that the measured speed of the variable-speed circulation fan 110 exceeds the Normal cooling CFM, the HVAC controller signals the variable-speed circulation fan 110 to reduce speed below the Normal cooling CFM. Signaling of the variable-speed circulation fan 110 is shown by way of example in FIG. 2 by arrow 272. Such a reduction of speed of the variable-speed circulation fan 110 ensures that the S/T ratio of, for example, the HVAC system 200 does not climb beyond a point where sufficient moisture removal is no longer possible such as, for example, 0.8. In some embodiments, cooling demand is tied to the speed of the variable speed circulation fan 110. Also, in some cases, it may not be possible to reduce a speed of the variable-speed circulation fan 110. This is due to the fact that, in some embodiments, the variable-speed circulation fan 110 has a minimum speed below which the variable-speed circulation fan 110 becomes unstable. Thus, in various embodiments, the HVAC controller 150 signals the variable-speed compressor 140 to increase speed responsive to a determination that the measured speed of the variable-speed circulation fan 110 exceeds the Normal cooling CFM. Signaling of the variable-speed compressor 140 is shown by way of example in FIG. 2 by arrow 294. Increasing a speed of the variable-speed compressor 140 raises the Normal cooling CFM and ensures that the S/T ratio of, for example, the HVAC system 200 does not climb beyond a point where sufficient moisture removal is no longer possible such as, for example, 0.8. Ensuring that the S/T ratio stays below, for example, 0.8 allows the HVAC system 100 to have sufficient latent capacity to effectively remove moisture from conditioned air.

Figure 3:
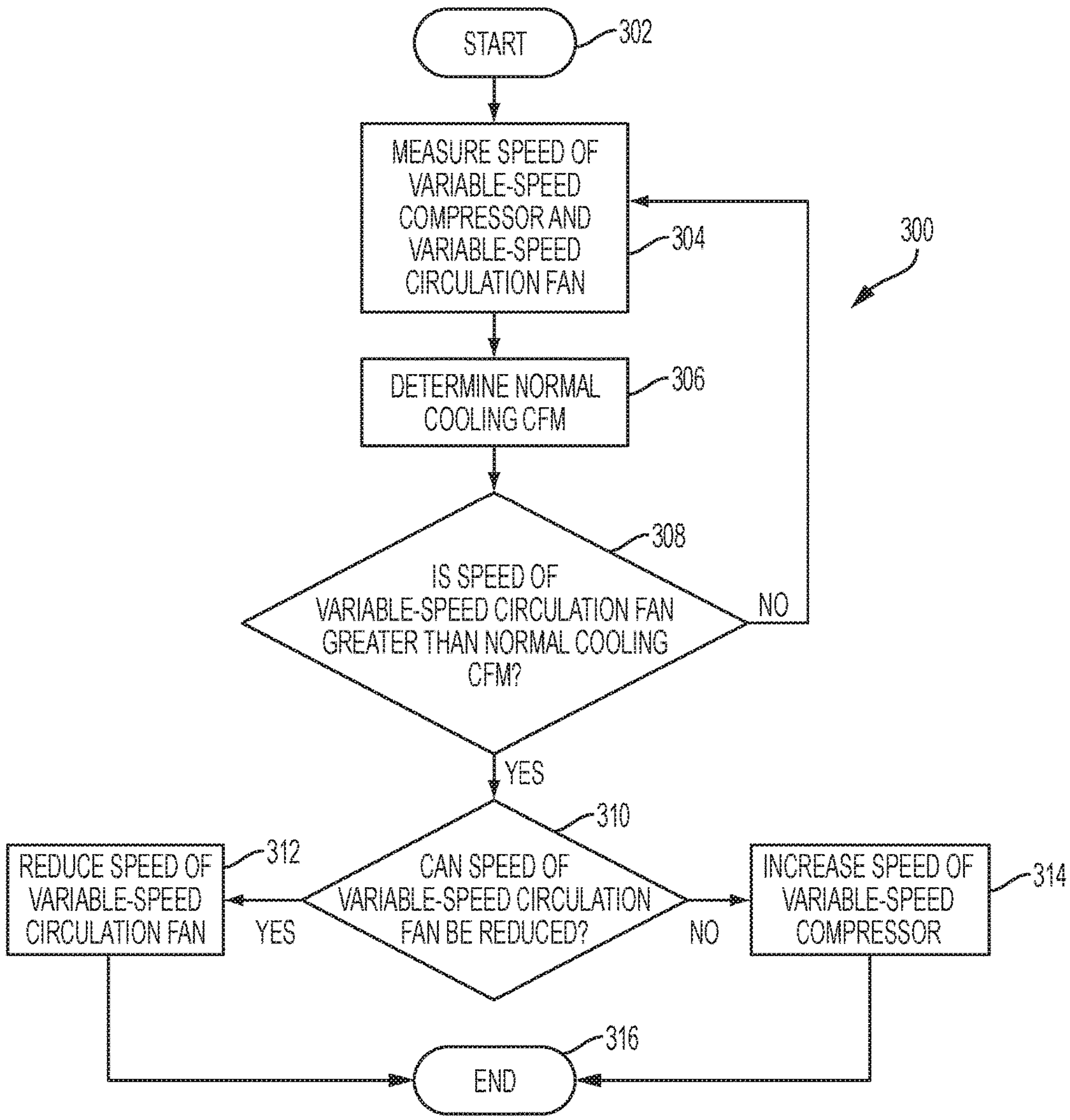
FIG. 3 is a flow diagram illustrating a method for optimizing latent capacity of a variable-speed compressor system according to an exemplary embodiment.

FIG. 3 is a flow diagram illustrating a process 300 for optimizing latent capacity. For illustrative purposes, the process 300 will be described relative to FIGS. 1-2. The process 300 starts at step 302. At step 304, the HVAC controller 150 measures a speed of the variable-speed compressor 140 and the variable-speed circulation fan 110. In a typical embodiment, the HVAC controller 150 continuously measures a speed of the variable-speed compressor and the variable-speed circulation fan 110; however, in other embodiments, the HVAC controller measures a speed of the variable-speed compressor 140 and the variable-speed circulation fan 110 according to a periodic time interval such as, for example, every five seconds. At step 306, the HVAC controller 150 determines the Normal cooling CFM from the measured speed of the variable-speed compressor, the rated speed of the variable-speed compressor 140, and the tonnage of, for example, the HVAC system 200. In a typical embodiment, the Normal cooling CFM is calculated according to Equation 1—

$$\dot{V}_{Normal} = \frac{F_a}{F_R}(\text{tonnage})(K).$$

Where $\dot{V}_{Normal}$ is the Normal cooling CFM, $F_a$ is an actual speed of a variable-speed compressor (Hz), $F_R$ is the rated speed of the variable-speed compressor (Hz), tonnage is the rated tonnage of the HVAC system, and K is a multiplier. In a typical embodiment, the multiplier ranges from approximately 350 to approximately 450 depending on design considerations and application. An exemplary multiplier of 400 is used herein for purposes of discussion. In a typical embodiment, the rated speed ($F_R$) is a known constant associated with a particular variable-speed compressor and the rated tonnage is a known constant associated with a particular HVAC system.

At step 308, the HVAC controller 150 compares the calculated Normal cooling CFM to the measured speed of the variable-speed circulation fan 110. In a typical embodiment, the HVAC controller 150 compares the measured speed of the variable-speed circulation fan 110 to the Normal cooling CFM continuously; however, in other embodiments, the HVAC controller 150 compares the measured speed of the variable-speed circulation fan 110 to the Normal cooling CFM according to a periodic time interval such as, for example, every seconds.

Still referring to FIG. 3, if it is determined in step 308 that the measured speed of the variable-speed circulation fan 110 exceeds the Normal cooling CFM, the process 300 proceeds to step 310. However, if it is determined at step 308 that the measured speed of the variable-speed circulation fan 110 does not exceed the Normal cooling CFM, the process 300 returns to step 304. At step 310, the HVAC controller 150 determines if it is possible to reduce a speed of the variable-speed circulation fan 110. In a typical embodiment, such a determination is made according to a minimum safe operating speed of the variable-speed circulation fan 110. If it is determined at step 310, that the speed of the variable-speed circulation fan 110 can be reduced, the process 300 proceeds to step 312. At step 312, the HVAC controller 150 signals the variable-speed circulation fan 110 to reduce speed to a speed below the Normal cooling CFM. Such a reduction of speed of the variable-speed circulation fan 110 ensures that the S/T ratio of, for example, the HVAC system 200 does not climb beyond a point where sufficient moisture removal is no longer possible such as, for example, 0.8. If it is determined at step 310 that it is not possible to reduce a speed of the variable-speed circulation fan 110, the process 300 proceeds to step 314. At step 314, the HVAC controller 150 signals the variable-speed compressor 140 to increase speed responsive to a determination that the measured speed of the variable-speed circulation fan 110 exceeds the Normal cooling CFM. Increasing a speed of the variable-speed compressor 140 raises the Normal cooling CFM and ensures that the S/T ratio of, for example, the HVAC system 200 does not climb beyond a point where sufficient moisture removal is no longer possible such as, for example, 0.8. Ensuring that the S/T ratio stays below, for example, 0.8 allows, for example, the HVAC system 200 to have sufficient latent capacity to effectively remove moisture from conditioned air. The process 300 ends at step 316.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the HVAC controller 150, one or more portions of the user interface 170, one or more portions of the zone controller 180, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, “can,” “might,” “may,” “e.g.,” and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A heating, ventilation, and air conditioning (HVAC) system comprising:
- an evaporator coil;
- a metering device fluidly coupled to the evaporator coil;
- a variable-speed circulation fan for circulating air around the evaporator coil;
- a condenser coil fluidly coupled to the metering device;
- a variable-speed compressor fluidly coupled to the condenser coil and the evaporator coil;
- a controller operatively coupled to the variable-speed compressor and the variable-speed circulation fan; and
- wherein the controller is configured to:
  - measure a speed of the variable-speed compressor;
  - calculate a normal cooling Cubic Feet per Minute (CFM);
  - measure a speed of the variable-speed circulation fan;
  - determine if the speed of the variable-speed circulation fan exceeds the normal cooling CFM;
  - responsive to a determination that the speed of the variable-speed circulation fan exceeds the normal cooling CFM, determine if the variable-speed circulation fan is operating at a minimum operating speed below which the variable-speed circulation fan becomes unstable; and
  - responsive to a determination that the variable-speed circulation fan is operating at the minimum operating speed, increase a speed of the variable-speed compressor.

2. The HVAC system of claim 1, wherein the HVAC system is a package HVAC system.

3. The HVAC system of claim 1, wherein the HVAC system is a split HVAC system.

4. The HVAC system of claim 1, wherein the controller measures the speed of the variable-speed compressor and the variable-speed circulation fan at periodic time intervals.

5. The HVAC system of claim 4, wherein the periodic time intervals comprise approximately five seconds.

6. The HVAC system of claim 1, wherein responsive to the determination that the variable-speed circulation fan is not operating at the minimum operating speed, the controller is configured to lower a speed of the variable-speed circulation fan.

7. The HVAC system of claim 6, wherein maintaining the speed of the variable-speed circulation fan below the normal cooling CFM optimizes the latent capacity of the HVAC system.

8. The HVAC system of claim 1, wherein raising the speed of the variable-speed compressor raises the normal cooling CFM.

9. A method of optimizing latent capacity of an HVAC system, the method comprising:
- measuring, using a controller, a speed of a variable-speed compressor;
- calculating, using the controller, a normal cooling CFM from the measured speed of the variable-speed compressor;
- measuring, using the controller, a speed of a variable-speed circulation fan;
- determining if the speed of the variable-speed circulation fan exceeds the normal cooling CFM;
- responsive to a determination that a speed of the variable-speed circulation fan exceeds the normal cooling CFM, determining if the variable-speed circulation fan is operating at a minimum operating speed below which the variable-speed circulation fan becomes unstable; and
- responsive to a determination that the variable-speed circulation fan is operating at the minimum operating speed, increasing, using the controller, a speed of the variable-speed compressor.

10. The method of claim 9, comprising responsive to a determination that the variable-speed circulation fan is not operating at the minimum operating speed, lowering, using the controller, the speed of the variable-speed circulation fan.

11. The method of claim 9, comprising measuring the speed of the variable-speed compressor and the speed of the variable-speed circulation fan at periodic time intervals.

12. The method of claim 11, wherein the periodic time intervals comprise approximately five seconds.

13. The method of claim 9, comprising measuring the speed of the variable-speed compressor and the speed of the variable-speed circulation fan continuously.

14. The method of claim 9, comprising optimizing the latent capacity of the HVAC system.

15. A heating, ventilation, and air conditioning (HVAC) system comprising:
- an evaporator coil;
- a metering device fluidly coupled to the evaporator coil;
- a variable-speed circulation fan for circulating air around the evaporator coil;
- a condenser coil fluidly coupled to the metering device;
- a variable-speed compressor fluidly coupled to the condenser coil and the evaporator coil;
- a controller operatively coupled to the variable-speed compressor and the variable-speed circulation fan; and
- wherein the controller is configured to:
  - measure a speed of the variable-speed compressor;
  - calculate a normal cooling CFM;
  - measure a speed of the variable-speed circulation fan;
  - determine if the speed of the variable-speed circulation fan exceeds the normal cooling CFM;
  - responsive to a determination that the speed of the variable-speed circulation fan exceeds the normal cooling CFM, determine if the variable-speed circulation fan is operating at a minimum operating speed below which the variable-speed circulation fan becomes unstable; and
  - responsive to a determination that the variable-speed circulation fan is operating at the minimum operating speed, increase a speed of the variable-speed compressor.

* * * * *